UNITED STATES PATENT OFFICE.

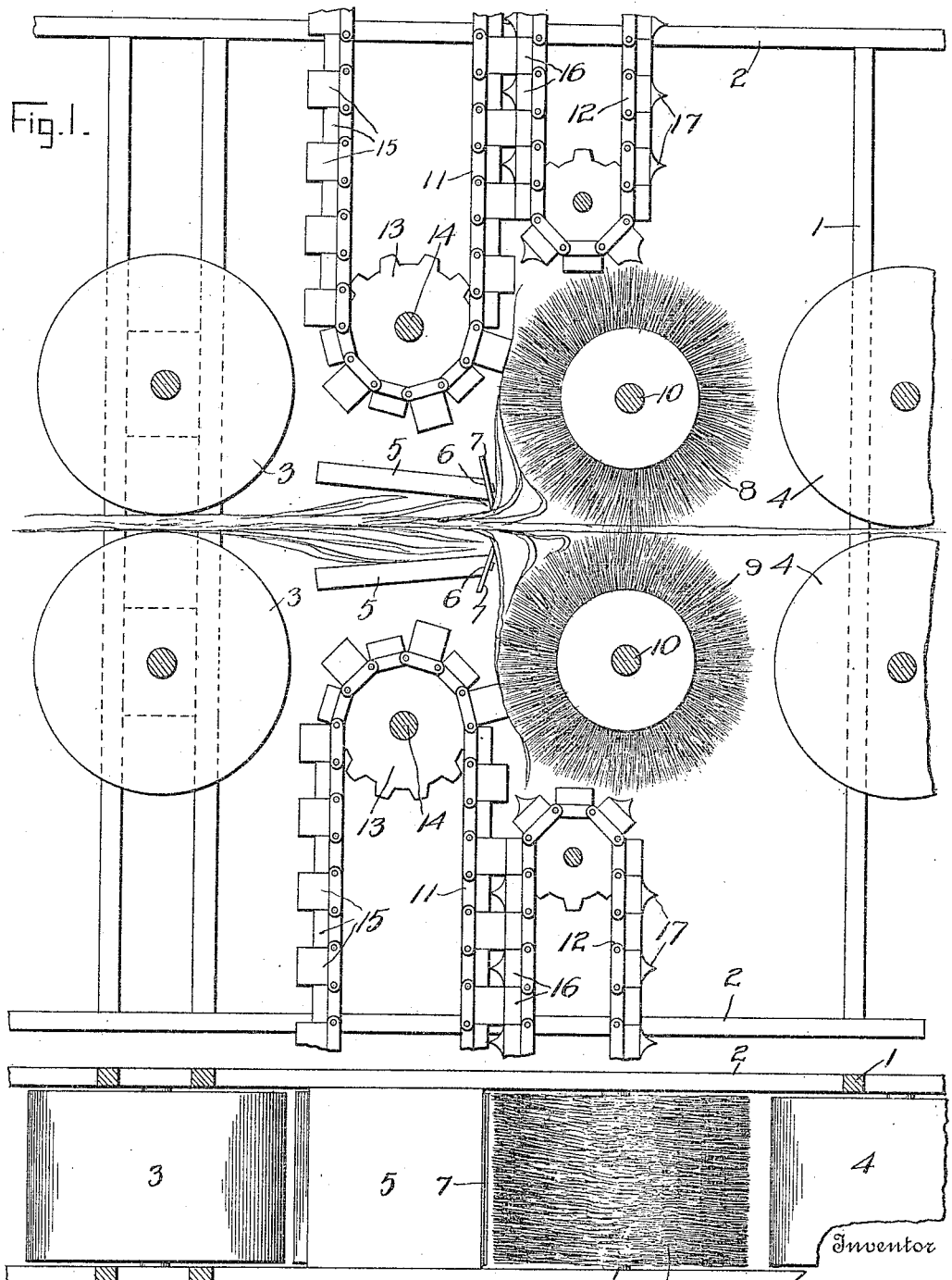

THOMAS J. PETERS, OF PERRINE, FLORIDA.

CANE-STRIPPING MECHANISM.

957,441. Specification of Letters Patent. Patented May 10, 1910.

Application filed August 18, 1909. Serial No. 513,498.

*To all whom it may concern:*

Be it known that I, THOMAS J. PETERS, a citizen of the United States, residing at Perrine, in the county of Dade and State of Florida, have invented certain new and useful Improvements in Cane-Stripping Mechanism, of which the following is a specification.

The present invention relates to stripping mechanism for cane harvesting machines and is designed with especial reference to that type of machine disclosed in my co-pending application bearing Serial No. 349,523, under date of December 26, 1906.

The purpose of the invention is to provide an improved means of the character described wherein the strippers have means coöperating therewith whereby the leaves or other tendrils are separated from the passing stalks without tearing the substance from the latter, and thus leaving their succulent juice bearing portions integral with the stalk.

A further advantage of the present method of stripping the cane is that the parts removed are themselves cut into such lengths that they may be readily ejected by the transferring means, and which therefore puts the same in condition for use when it leaves the machine, as for instance in a condition for fodder, etc.

The invention is shown in its preferred structure in the accompanying drawing, wherein, Figure 1 shows a longitudinal sectional view thereof, and, Fig. 2 is a plan view thereof.

Referring to the details of structure and wherein like numerals of reference indicate corresponding parts in the different views shown, 1 designates a suitable upright frame work which with the frames 2 constitute the necessary supporting structure. Within the fore part of the frame is journaled a pair of feeding rollers 3 of the usual type, and which with a pair of like rollers 4 comprise the means for forwarding the stalks from the transferring belt to the usual chopping mechanism, said latter parts being common to such machines and are therefore not shown in the present case.

Interposed between the pairs of feeding rollers 3 and 4 and nearer the former is disposed an upper and lower stock 5 which converge slightly in the direction of the roller 4, and which on their converging ends are beveled as at 6 to support the knives 7 in the manner shown. The stocks 5 are coextensive in width with the rollers 3 and 4, *i. e.* entirely across the machine, and therefore provide a sort of gatherer or throat for the passing stalks as they leave the rollers 3. Immediately behind the knives 7 in the path of movement of the stalks is the stripping means which consists of an upper and lower revolving brush 8 and 9 respectively, said brushes being suitably journaled within the frame on the shafts 10, and being of course intergeared whereby to rotate in unison. The direction of rotation of the stripping brushes is that indicated by the arrows which as will be obvious is reverse to the direction of travel of the cane.

Each of the rotary brushes 8 and 9 has coöperating therewith a pair of intermeshing endless chains 11 and 12 respectively and of which the former is the longer. Said chains are adapted to turn upon the sprocket wheels 13 of which only those at one end of the chains are shown, the sprocket wheels being journaled on the shafts 14 to which movement is imparted through the general operating mechanism of the machine as will be readily understood. The several links of the chain 11 carry each a wooden strip 15 of which every other one is twice the thickness of those intermediate. To each link of the chain 12 there is likewise attached a wooden strip 16 all of which are of like size, though the alternating strips are provided with a plurality of metallic points 17 adapted to fit within that space provided between each pair of thicker strips 15 on the chain 11 when both chains intermesh, in precisely that manner shown in Fig. 1.

By reason of disposing the chains 11 and 12 in the manner shown permits the metallic edges 17 to engage within the bristles of the cleaning brushes and comb therefrom such particles of the strip substance that may, through any reason, adhere thereto, and in their coöperation the leaves or other material torn from the cane by the brushes 7 is carried off between them to a suitable receiver, and during which transferring the parts removed are cut up into small particles for the purpose above stated.

When the rollers 3 receive the cane from the belt of the harvester, the cane is forwarded to the rollers 4 with its tops foremost, wherefore on coming in contact with the stripping brushes 8 and 9 the leaves or other tendrils are torn therefrom after the manner shown in Fig. 1, and should through any reason the parts being removed tend to tear the substance from the stalk, such pulling as would attend this would cause the piece being separated to be drawn with sufficient force against the cutting edge of the knife 7 and thereby sever the same.

Having thus described my invention, what I claim as new therein and desire to secure by Letters Patent, is:—

1. Cane stripping mechanism comprising rollers adapted to receive the cane stalks and feed the same, brushes disposed to the rear of the rollers and adapted to rotate and engage the strip portions of the cane stalks, and means coöperating with said rotating brushes adapted to sever said strips whereby the succulent portions thereof are caused to remain integral with the cane stalks.

2. Cane stripping mechanism comprising rollers adapted to receive the cane stalks and feed the same, brushes disposed to the rear of the rollers and adapted to rotate and engage the strip portions of the cane stalks, and means coöperating with said brushes whereby the same are cleaned of particles adhering thereto, said means adapted to cut up into small particles the strips removed from the stalks and convey the same to a point removed from the stripping mechanism.

3. Cane stripping mechanism comprising rollers adapted to receive the cane stalks and feed the same, brushes disposed to the rear of the rollers and adapted to rotate and engage the strip portions of the cane stalks, means whereby succulent portions of the strips are caused to remain integral with the cane stalks, and means for cutting the removed strips into small particles, said means serving to convey the cut up strips to a point removed from the stripping mechanism.

4. Cane stripping mechanism comprising rollers adapted to receive the cane stalks and feed the same, rotatable stripping brushes disposed to the rear of said rollers, knives fixed adjacent said brushes and adapted to sever the thicker portions of the strips when said strips are tensioned by the brushes, thereby leaving the succulent portions of the strips on the cane stalks, and a conveyer for carrying off the strips removed.

5. Cane stripping mechanism comprising rollers adapted to receive the cane stalks and feed the same, rotatable stripping brushes disposed to the rear of said rollers, and a pair of intermeshing endless conveyer chains adapted to remove adhering particles from the brushes and to cut up into small particles the strips conveyed.

6. Cane stripping mechanism comprising rollers adapted to receive the cane stalks and feed the same, rotatable stripping brushes disposed to the rear of said rollers, a pair of knives disposed adjacent said brushes and coöperating therewith whereby to cause the succulent portions of the strips to adhere to the cane stalks, and endless intermeshing conveyer chains adapted to comb the brushes and carry off the strips, said chains having means whereby the material removed is cut up into small particles.

7. Cane stripping mechanism comprising rollers adapted to receive the cane stalks and feed the same, a pair of rotatable stripping brushes disposed to the rear of said rollers, stocks disposed transverse of the machine and in advance of the stripping rollers and providing a throat for the cane fed from the rollers, knives fixed on said stocks adjacent said brushes and adapted to coöperate therewith whereby to cause the succulent portions of the cane strips to adhere to the stalks; and endless intermeshing conveyer chains adapted to cut up into small particles the material removed and to carry off the same.

8. Cane stripping mechanism comprising rollers adapted to receive the cane stalks and feed the same, a pair of rotatable stripping brushes disposed to the rear of said rollers, and endless intermeshing conveyer chains adapted to comb said brushes and to carry off the strips removed from the cane, one of said conveyer chains having strips of different thicknesses secured in alternate relation on the links thereof, and the other of said chains having strips secured on the links thereof, said latter named strips being alternately provided with cutting members adapted to engage between the strips of the firstnamed chain when said chains intermesh whereby to cut up into small particles the material conveyed thereby.

The foregoing specification signed at Miami Florida this twenty-second day of June, 1909.

THOS. J. PETERS.

In presence of two witnesses:
L. A. COOLEY,
THOS. S. DAVENPORT.